(12) United States Patent
Koga et al.

(10) Patent No.: US 8,976,139 B2
(45) Date of Patent: Mar. 10, 2015

(54) ELECTRONIC DEVICE

(71) Applicant: Panasonic Corporation, Osaka (JP)

(72) Inventors: Akira Koga, Osaka (JP); Ryo Okumura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 159 days.

(21) Appl. No.: 13/740,374

(22) Filed: Jan. 14, 2013

(65) Prior Publication Data

US 2013/0187879 A1 Jul. 25, 2013

(30) Foreign Application Priority Data

Jan. 20, 2012 (JP) .................................. 2012-009890
Dec. 10, 2012 (JP) .................................. 2012-268921

(51) Int. Cl.
 G06F 3/041 (2006.01)
 G06F 3/01 (2006.01)
 G06F 1/16 (2006.01)

(52) U.S. Cl.
 CPC .............. G06F 3/016 (2013.01); G06F 1/1616 (2013.01); G06F 1/1684 (2013.01)
 USPC .. 345/173; 345/1.3; 361/679.01; 361/679.55; 715/702

(58) Field of Classification Search
 USPC .............. 345/156, 169, 173, 1.3; 361/679.01, 361/679.55; 340/407.1; 715/702
 See application file for complete search history.

(56) References Cited

U.S. PATENT DOCUMENTS

| 5,576,727 | A | 11/1996 | Rosenberg et al. |
| 2002/0149561 | A1* | 10/2002 | Fukumoto et al. ............ 345/156 |
| 2005/0174336 | A1 | 8/2005 | Nakayama et al. |
| 2006/0046843 | A1 | 3/2006 | Nakajima |
| 2009/0051667 | A1* | 2/2009 | Park et al. .................... 345/173 |
| 2009/0227295 | A1* | 9/2009 | Kim ............................... 455/566 |
| 2010/0141410 | A1* | 6/2010 | Aono et al. ................. 340/407.2 |
| 2011/0242035 | A1* | 10/2011 | Nozawa et al. ............... 345/173 |

FOREIGN PATENT DOCUMENTS

| JP | 2005-222326 A | 8/2005 |
| JP | 2006-122164 A | 5/2006 |
| JP | 2008-046844 A | 2/2008 |
| JP | 2009-015791 A | 1/2009 |

* cited by examiner

*Primary Examiner* — Koosha Sharifi-Tafreshi
(74) *Attorney, Agent, or Firm* — Renner, Otto, Boisselle & Sklar, LLP

(57) ABSTRACT

An electronic device 10 includes a casing 14, a display section 12 for displaying information, a touch panel 11 to be touched by the user, a connecting portion 16 for connecting together the casing 14 and the touch panel 11, a vibrating section 13 for vibrating the touch panel 11, and a vibration control section 33 for controlling the vibration of the vibrating section 13. The vibration control section 33 controls the vibration so as to generate a greater vibration when the touch panel 11 is supported only by the connecting portion 16 than when the touch panel 11 is supported by the connecting portion 16 and another point of support other than the connecting portion 16.

7 Claims, 8 Drawing Sheets

ELECTRONIC DEVICE

BACKGROUND

1. Technical Field

The present disclosure relates to an electronic device which generates vibrations, etc., in response to a touch operation by a user.

2. Description of the Related Art

For electronic devices with touch panels provided on display screens, there are techniques known in the art for giving a tactile sensation to the user by vibrating the touch panel for the purpose of improving the controllability for the user. A voltage is applied to a vibrating section provided in the touch panel so as to generate vibrations to the touch panel, thereby giving a tactile sensation to the user (see, for example, Japanese Laid-Open Patent Publication No. 2005-222326). Japanese Laid-Open Patent Publication No. 2005-222326 is directed to a tablet-type electronic device capable of giving a tactile sensation. A tablet-type electronic device can be held by one hand or placed on a desk, or the like, and a touch operation can be performed on the touch panel.

SUMMARY

The present disclosure provides an electronic device capable of stably presenting, to the user, vibrations generated in response to user operations.

An electronic device according to one embodiment of the present disclosure includes: a casing; a display section for displaying information; a panel to be touched by a user; a connecting portion for connecting together the casing and the panel; a vibrating section for vibrating the panel; and a vibration control section for controlling the vibration of the vibrating section. The vibration control section generates a greater vibration when the panel is supported only by the connecting portion than when the panel is supported by the connecting portion and another point of support other than the connecting portion.

With an electronic device according to one embodiment of the present disclosure, a greater vibration is generated when the panel is supported only by the connecting portion than when the panel is supported by the connecting portion and another point of support other than the connecting portion. Thus, it is possible to stably present a vibration to the user.

With an electronic device according to one embodiment, a greater vibration is generated when the panel is not horizontal than when the panel is vibration. Thus, it is possible to stably present a vibration to the user.

With an electronic device according to one embodiment, a greater vibration is generated when the pressure acting upon one side that is opposite to the side on which a touch by the user is detected is lower than when the pressure is higher. Thus, it is possible to stably present a vibration to the user.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1A:
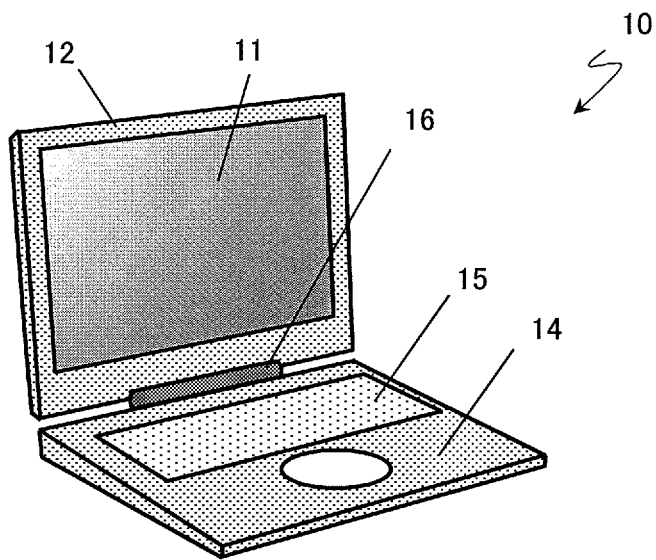
FIG. 1A is an external perspective view showing an electronic device according to one embodiment.

Embodiments will now be described in detail, referring to the drawings. Note however that unnecessarily detailed descriptions may be omitted. For example, detailed descriptions on what are well known in the art or redundant descriptions on substantially the same configurations may be omitted. This is to prevent the following description from becoming unnecessarily redundant, to make it easier for a person of ordinary skill in the art to understand.

Note that the present inventors provide the accompanying drawings and the following description in order for a person of ordinary skill in the art to sufficiently understand the present disclosure, and they are not intended to limit the subject matter set forth in the claims.

(Embodiment 1)

Where the electronic device is a notebook personal computer-type electronic device, for example, the touch panel is connected with a casing including a keyboard via a connecting portion, and the user operates the electronic device while it is placed on a desk, or the like, with the touch panel opened with respect to the casing. While operating in such a position, when the user pushes the touch panel, the electronic device body may tilt or the touch panel may open further, making it difficult for the user to operate the electronic device stably. Similarly, while a tablet-type electronic device is supported unstably, when the user pushes the touch panel with a finger, the electronic device body may tilt or sway, making it difficult for the user to operate the electronic device stably. In such a state, it is also difficult to stably present, to the user, vibrations generated on the touch panel in response to user operations.

The electronic device according to one embodiment is a notebook personal computer-type electronic device. With a notebook personal computer-type electronic device, when the user performs a touch operation in a state where the touch panel is supported only by the connecting portion, the touch operation becomes unstable as described above. In such a state where the touch panel is supported only by the connecting portion, a greater vibration can be generated on the touch panel so that the user can reliably perceive the completion of a touch operation even when the user touches with a weak force. Since the user can comfortably perform the touch operation even with a weak force, the user will no longer push the touch panel with an excessive force, and it is therefore possible to prevent the tilt of the device body and to realize stable operations.

<Generation Configuration of Electronic Device>

Referring to FIGS. 1A, 1B, 2, 3 and 4, a general configuration of an electronic device 10 according to one embodiment will be described.

Figure 1B:
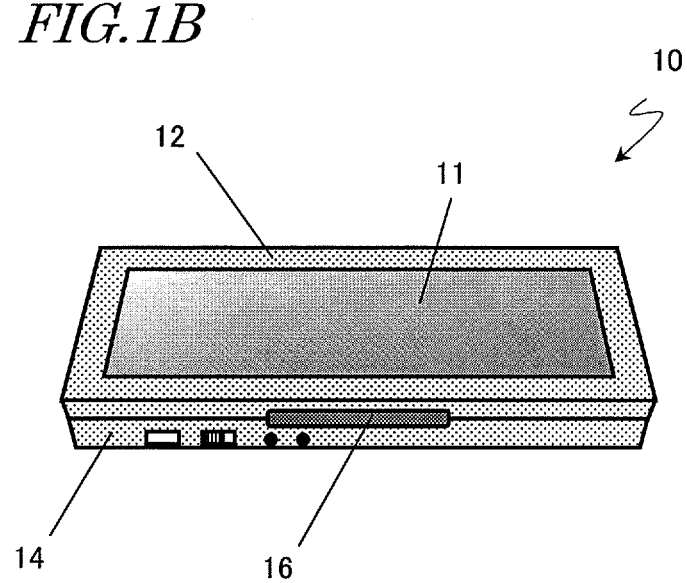
FIG. 1B is an external perspective view showing an electronic device according to one embodiment.
Figure 2:
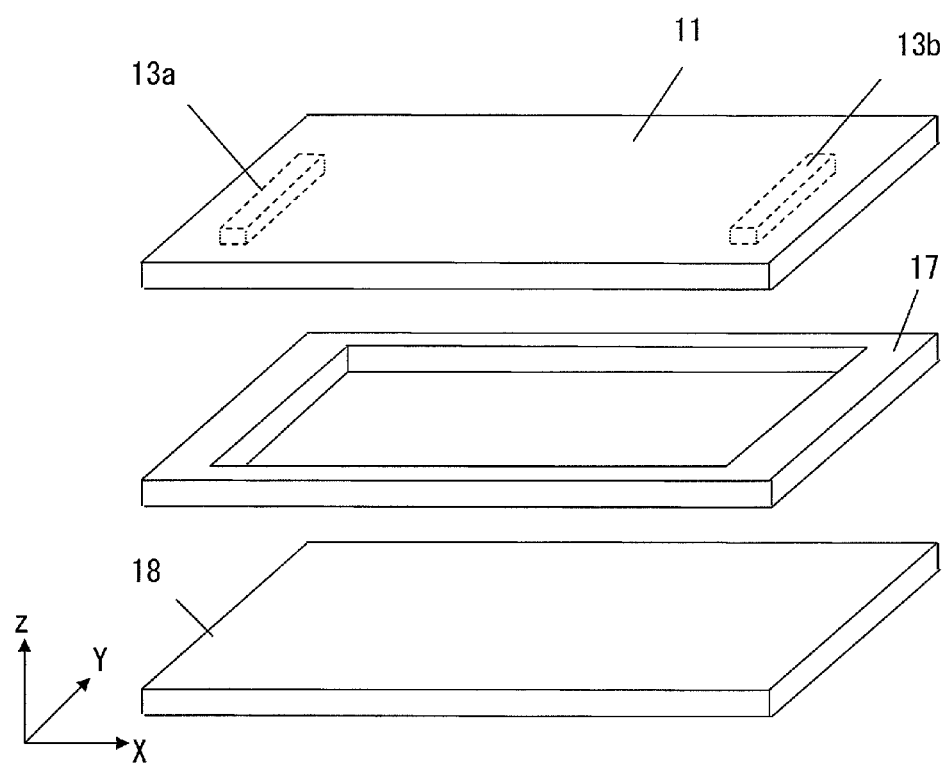
FIG. 2 is a diagram showing a configuration of a display section according to one embodiment.
Figure 3:
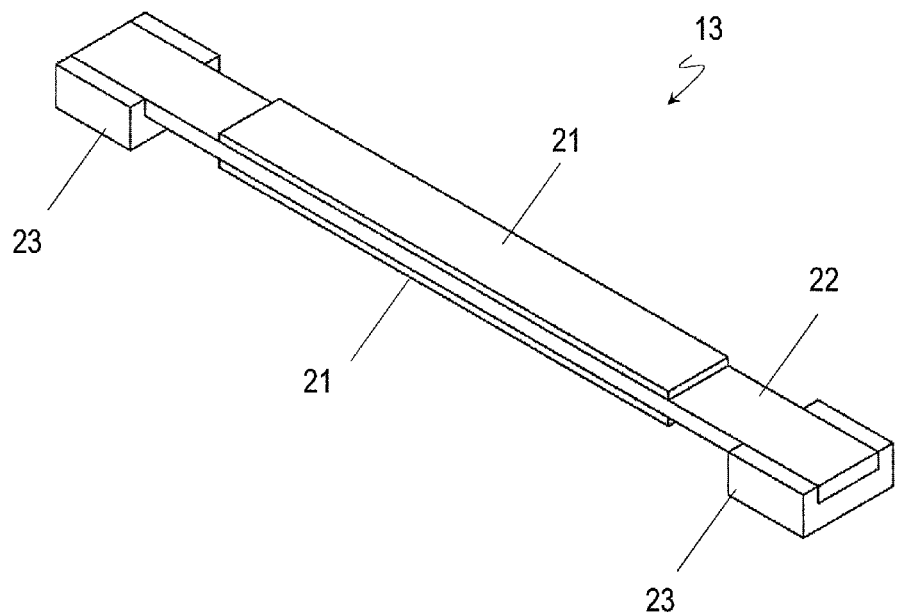
FIG. 3 is an external perspective view showing an vibrating section according to one embodiment.
Figure 4:
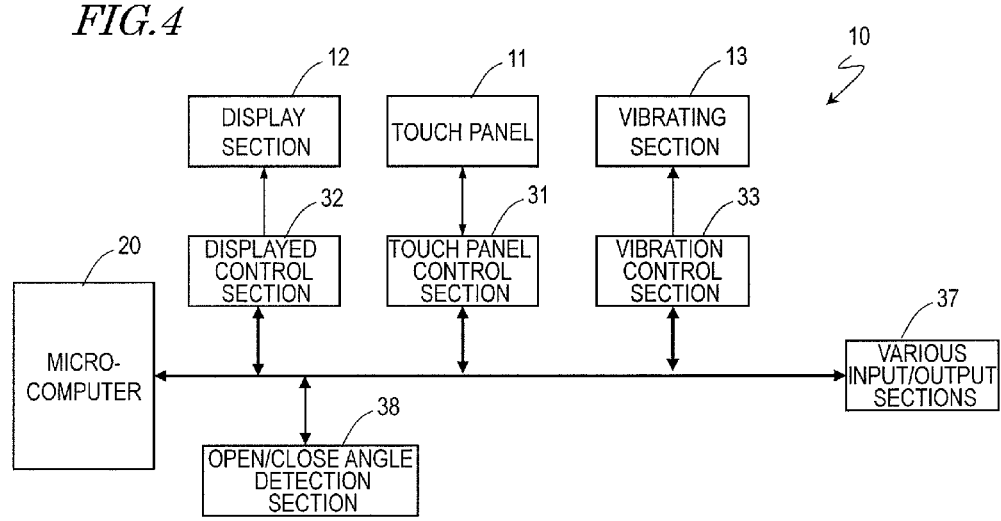
FIG. 4 is a block diagram showing a configuration of an electronic device according to one embodiment.

FIGS. 1A and 1B are perspective views showing the external appearance of the electronic device 10. FIG. 2 is a diagram showing a configuration of a display section 12. FIG. 3 is an external perspective view of a vibrating section 13. FIG. 4 is a block diagram showing a configuration of the electronic device 10.

As shown in FIG. 1A, in the electronic device 10, a touch panel 11 is incorporated on the display surface side of the display section 12. The display section 12 and a casing 14 are connected together by a connecting portion 16, and the display section 12 and the casing 14 can open/close with respect to each other, with the connecting portion 16 being the axis of rotation. A keyboard 15 is incorporated in the casing 14. The touch panel 11 is an example of a panel member for receiving a touch operation by the user and detecting the touch position. The connecting portion 16 is configured so that the display section 12 can be flipped around. FIG. 1B shows the display section 12 having been flipped around and closed.

As shown in FIG. 2, the display section 12 includes a display panel 18, the touch panel 11, vibrating sections 13a and 13b, and a spacer 17. The vibrating sections 13a and 13b are bonded to the touch panel 11. The touch panel 11 and the display panel 18 are bonded and held together, with the spacer 17 interposed therebetween. The spacer 17 is a shock-absorbing member of a silicon rubber, a urethane rubber, or the like, for example.

As shown in FIG. 3, the vibrating section 13 includes piezoelectric elements 21, a shim plate 22, and bases 23. The piezoelectric elements 21 are attached to the front side and the rear side of the shim plate 22, and the opposite ends of the shim plate 22 are attached to the bases 23. The bases 23 are attached to the touch panel 11.

The piezoelectric element 21 is, for example, piezoelectric ceramic of lead zirconate titanate, or the like, or piezoelectric single crystal of lithium niobate, or the like. The piezoelectric elements 21 are stretched and shrunk by voltage application. A control can be performed such that one of the piezoelectric elements 21 attached on opposite sides of the shim plate 22 stretches while the other shrinks, thereby generating flexural vibrations on the shim plate 22. The vibration frequency is desirably about 100-400 Hz.

The shim plate 22 is, for example, a spring member of phosphor bronze, etc. The vibration of the shim plate 22 vibrates the touch panel 11 via the bases 23, and the user operating the touch panel 11 can feel the vibration of the touch panel 11. The bases 23 are, for example, a metal such as aluminum or brass, or a plastic such as PET or PP.

Note that while the piezoelectric elements 21 are attached to the shim plate 22 in the present embodiment, the piezoelectric elements 21 may be attached directly to the touch panel 11. Alternatively, the piezoelectric elements 21 may be attached directly to any of the members of the electronic device 10, e.g., members of the display section 12 or the casing 14, other than the touch panel 11. Alternatively, a thin-film transparent piezoelectric member may be formed on the touch panel 11 by a method such as sputtering, and used as the vibrating section 13. Where a cover member, or the like, is present on the touch panel 11, the piezoelectric elements 21 may be attached to the cover member. Note that where a cover member is present on the touch panel 11, the touch panel 11 and the cover member are collectively referred to as a panel member for detecting a touch position. A vibration motor may be used as the vibrating section 13.

As shown in FIG. 4, the electronic device 10 includes a display control section 32 for controlling the information display of the display section 12, a touch panel control section 31 for controlling the touch panel 11, and a vibration control section 33 for controlling the vibration of the vibrating section 13. The electronic device 10 also includes a microcomputer 20 for performing various controls, various input/output sections 37, and an open/close angle detection section 38.

<Description of Each Component>

The display section 12 displays characters, numbers, icons, keyboards, etc., used for accepting inputs from the user. When a keyboard is displayed on the display section 12, the user can make a character input, etc., by performing a touch operation at an arbitrary position on the keyboard. The display section 12 may be a known display device of, for example, a liquid crystal type, an organic EL type, an electronic paper type, a plasma type, etc.

The display control section 32 controls the content displayed on the display section 12 based on the control signal generated by the microcomputer 20.

The touch panel 11 can detect the touch position of the user. Information on the touch position of the user is sent to the microcomputer 20 via the touch panel control section 31. The touch panel 11 may be a touch panel of, for example, an electrostatic type, a resistive type, an optical type, an ultrasonic type, an electromagnetic type, etc.

While the touch panel 11 and the display panel 18 are separate components in this example, the touch panel 11 and the display panel 18 may be formed as an integral member.

For example, an in-cell type touch panel may be employed where the touch panel function is integrated inside a liquid crystal panel, or an on-cell type touch panel may be employed where the touch panel function is integrated on the surface of a liquid crystal panel.

The vibrating section 13 vibrates the touch panel 11. The vibration control section 33 controls the vibration pattern of the vibrating section 13.

The open/close angle detection section 38 detects the open/close angle of the connecting portion 16. Thus, it is possible to detect the open/close state of the display section 12 (the positional relationship between the touch panel 11 and the casing 14). The detected open/close angle is sent to the microcomputer 20. The microcomputer 20 changes the control pattern of the vibration control section based on the detection result. The open/close angle detection section 38 may be of an optical type, a magnetic type, an electrical resistance type, etc.

<Touch Input Operation>

Figure 5A:
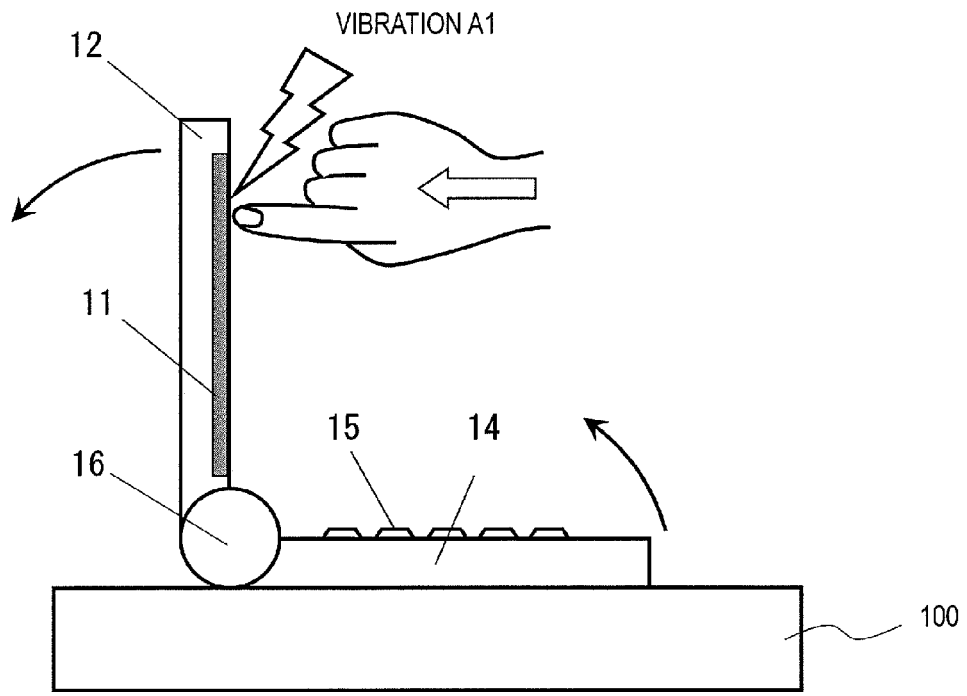
FIG. 5A is a cross-sectional view showing an electronic device according to one embodiment.
Figure 5B:
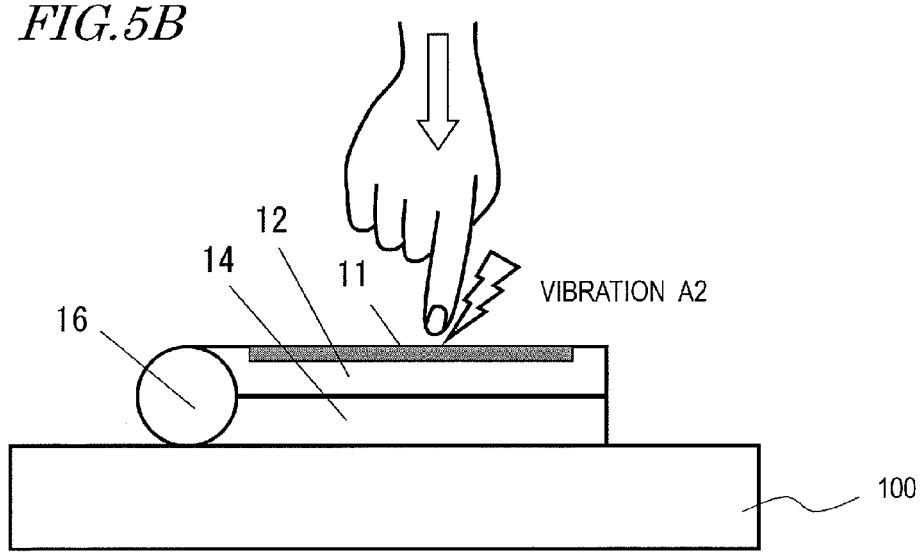
FIG. 5B is a cross-sectional view showing an electronic device according to one embodiment.

Referring to FIGS. 5A and 5B, an operation of making an input on the touch panel 11 will be described.

FIG. 5A is a cross-sectional view showing the electronic device 10, with the display section 12 being in an open position. FIG. 5B is a cross-sectional view showing the same, with the display section 12 being in a flipped-and-closed position. In FIG. 5A, the display section 12 is supported only by the connecting portion 16. In FIG. 5B, the display section 12 is supported by the connecting portion 16 and the casing 14, which is an example of a point of support other than the connecting portion 16. A point of support other than the connecting portion 16 may be the desk, etc., on which the electronic device 10 is placed. Note that the term "point of support" is used herein even when the display section 12 is in surface contact with what is supporting the display section 12. The position of FIG. 5A is an unstable position in which the electronic device 10 easily tilts in the direction of the arrow when the user performs a touch operation on the touch panel 11. The position of FIG. 5B is a stable position in which the electronic device 10 does not tilt when the user performs a touch operation on the touch panel 11.

When the user touches and operates the touch panel 11 while the display section 12 is in an open position as shown in FIG. 5A, the vibrating section 13 generates vibration A1 on the touch panel 11. When the user touches the touch panel 11 in the position of FIG. 5B, the vibrating section 13 generates vibration A2 on the touch panel 11.

Figure 6A:
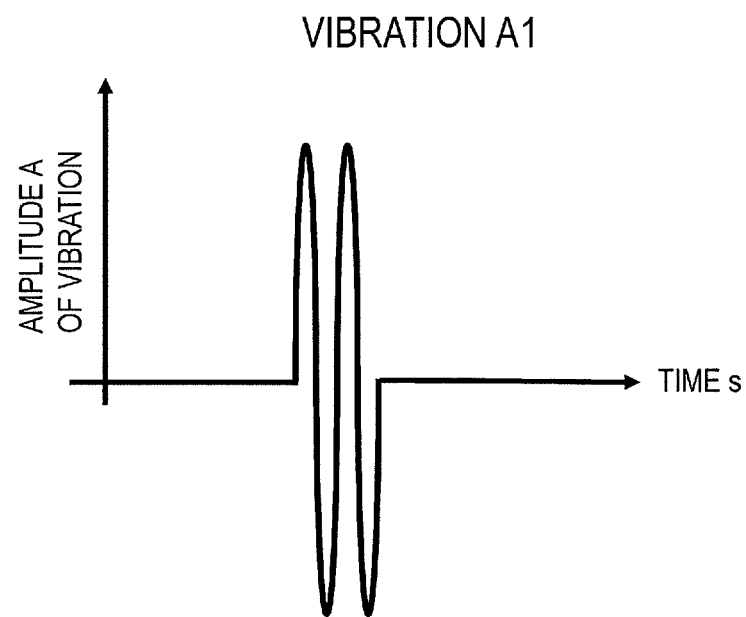
FIG. 6A is a diagram showing an example of a vibration pattern of a vibrating section according to one embodiment.
Figure 6B:
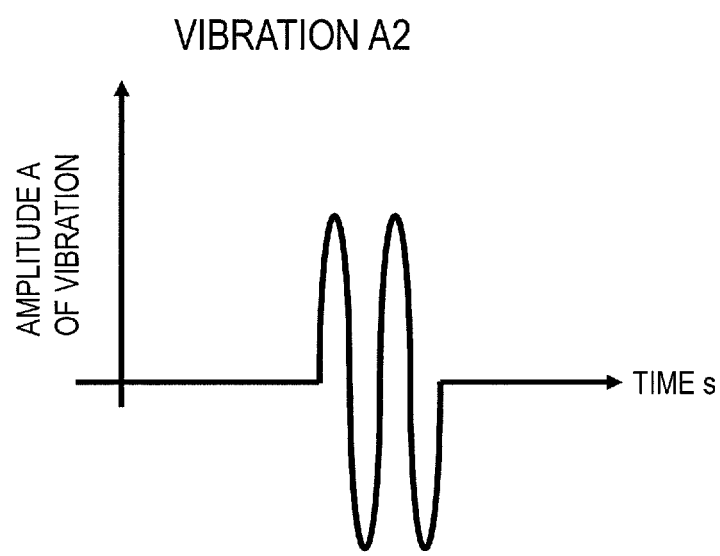
FIG. 6B is a diagram showing an example of a vibration pattern of a vibrating section according to one embodiment.

FIGS. 6A and 6B are schematic diagrams showing examples of vibration patterns. In response to an instruction from the microcomputer 20, the vibration control section 33 applies a voltage having a waveform shown in FIG. 6A to the vibrating section 13 to vibrate the touch panel 11, thereby giving the user vibration A1. The voltage for generating vibration A1 is a sinusoidal wave of 150 Hz, 100 Vrms and 2 cycles. Then, the amplitude on the touch panel 11 is about 15 µm. The vibration control section 33 applies a voltage shown in FIG. 6B to the vibrating section 13 to vibrate the touch panel 11, thereby giving the user vibration A2. The voltage for generating vibration A2 is a sinusoidal wave of 150 Hz, 33 Vrms and 2 cycles. Then, the amplitude on the touch panel 11 is about 5 µm. Based on the detection result of the open/close angle detection section 38, the microcomputer 20 instructs the vibration control section 33 so as to generate vibration A1 when the display section 12 is open and vibration A2 when the display section 12 is closed.

Note that the frequency, the voltage and the number of cycles are merely illustrative, and it may be a different waveform such as a square wave or saw-tooth wave, an intermittent waveform, or a waveform whose frequency or amplitude changes continuously. Note that by setting the frequency and the voltage so that the amplitude of vibration to be transmitted to the user's finger is about 5-50 µm, it is possible to present a tactile sensation (vibration) that feels comfortable on a finger of a person.

With the amplitude of vibration A1 being larger than that of vibration A2, the user can reliably operate the touch panel 11 even when touching the touch panel 11 with a weak force, thereby preventing the tilting of the electronic device 10 and thus realizing a stable touch operation.

According to the present embodiment, if a touch operation is performed while the touch panel is supported only by the connecting portion, a greater vibration is generated on the touch panel so that the user can perceive the completion of a touch operation even when the user touches with a weak force. Since the user can perform the touch operation with a weak force, the user will no longer push the touch panel with an excessive force, and it is therefore possible to prevent the tilt of the device body and to realize stable operations. When a touch operation is performed with the touch panel having been flipped and closed onto the keyboard, the touch panel is stably supported by a hand or a desk other than the connecting portion. In this position, it is possible to present a comfortable tactile sensation to the user by generating a weaker vibration on the touch panel, since the user might feel uncomfortable with the vibration of the touch panel being felt excessively.

(Embodiment 2)

Next, the electronic device 10 according to Embodiment 2 will be described. Like components of the electronic device 10 of Embodiment 2 to those of the electronic device 10 of Embodiment 1 will be denoted by like reference numerals and will not be described redundantly.

Figure 7A:
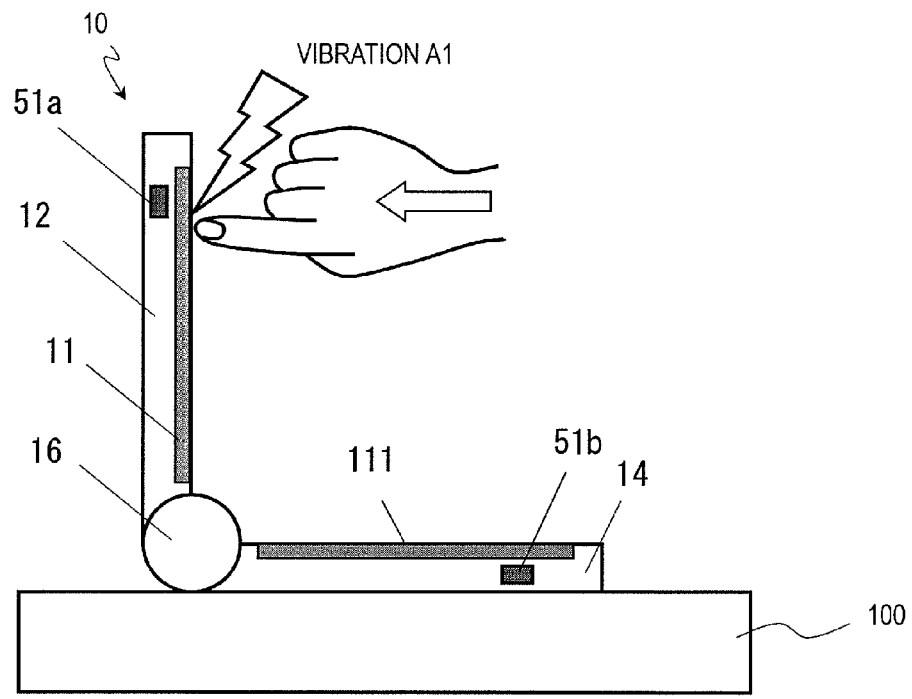
FIG. 7A is a cross-sectional view showing an electronic device according to one embodiment.
Figure 7B:
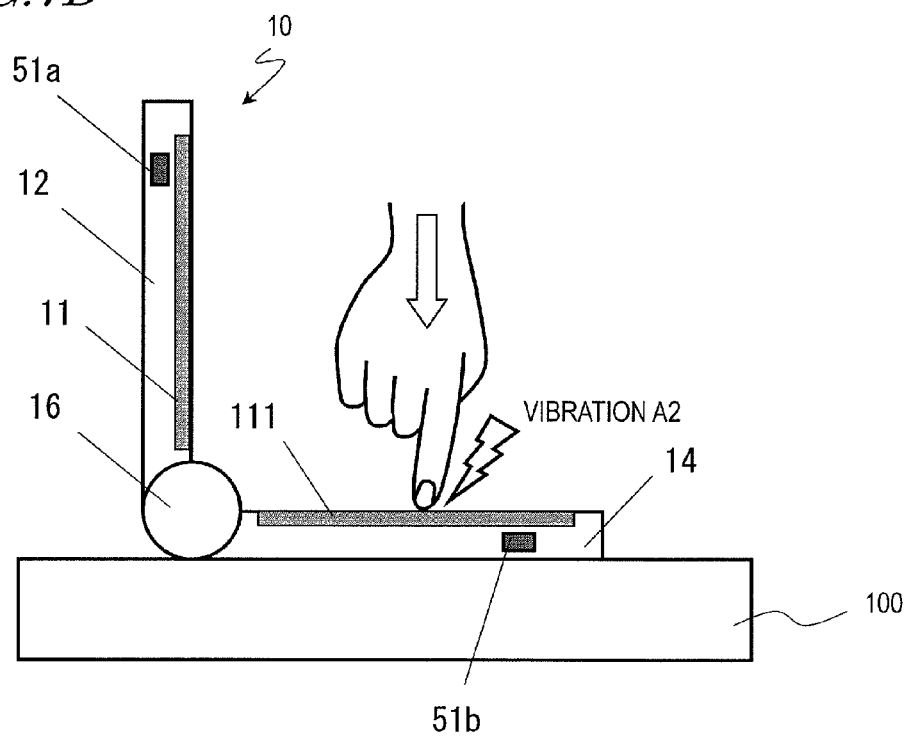
FIG. 7B is a cross-sectional view showing an electronic device according to one embodiment.

FIGS. 7A and 7B are cross-sectional views showing the electronic device 10 of Embodiment 2. The electronic device 10 includes the connecting portion 16 for connecting together the display section 12 and the casing 14. The touch panel 11 and a tilt angle sensor 51a are incorporated in the display section 12. A touch panel 111 and a tilt angle sensor 51b are incorporated in the casing 14. The vibrating section 13 is provided in each of the touch panels 11 and 111. Note that a gyrosensor, for example, may be used as the sensor for detecting the tilt angle.

When the user performs a touch operation with the touch panels 11 and 111 being open, vibration A1 is generated on the touch panel 11 and vibration A2 on the touch panel 111.

The tilt angle sensors 51a and 51b detect the tilt angles of the touch panels 11 and 111, respectively. When the tilt angle sensor 51b detects that the touch panel 111 is horizontal, it is determined that the touch panel 111 and the casing 14 are stably supported by a desk 100, and therefore vibration A2 is generated on the touch panel 111. When the tilt angle sensor 51a detects that the touch panel 11 is not horizontal, it is determined that the touch panel 11 is not stably supported, and therefore vibration A1 is generated on the touch panel 11.

By generating a greater vibration on the touch panel 11, which easily tilts when touched in a touch operation, the user can reliably perceive the completion of a touch operation even when the user touches with a weak force.

Since the user can comfortably perform the touch operation even with a weak force, the user will no longer push the touch panel 11 with an excessive force, and it is therefore possible to prevent the tilt of the device body and to realize stable operations. The touch panel 111 is stably supported by a hand, a desk, or the like. In this position, it is possible to present a comfortable tactile sensation to the user by generating a weaker vibration on the touch panel 111, since the user might feel uncomfortable with the vibration of the touch panel 111 being felt excessively.

Note that when the position of the electronic device 10 is changed so that the tilt angle sensor 51a detects that the touch panel 11 is horizontal, vibration A2 is generated on the touch panel 11. When the tilt angle sensor 51b detects that the touch panel ill is not horizontal, vibration A1 is generated on the touch panel 111.

While this example is directed to a method of detecting the tilting of the touch panels 11 and 111 by using the tilt angle sensors 51a and 51b, respectively, pressure sensors may be provided on the back side of the display section 12 and the casing 14, and used to detect whether the display section 12 or the casing 14 is being supported by a hand or a desk.

Figure 8A:
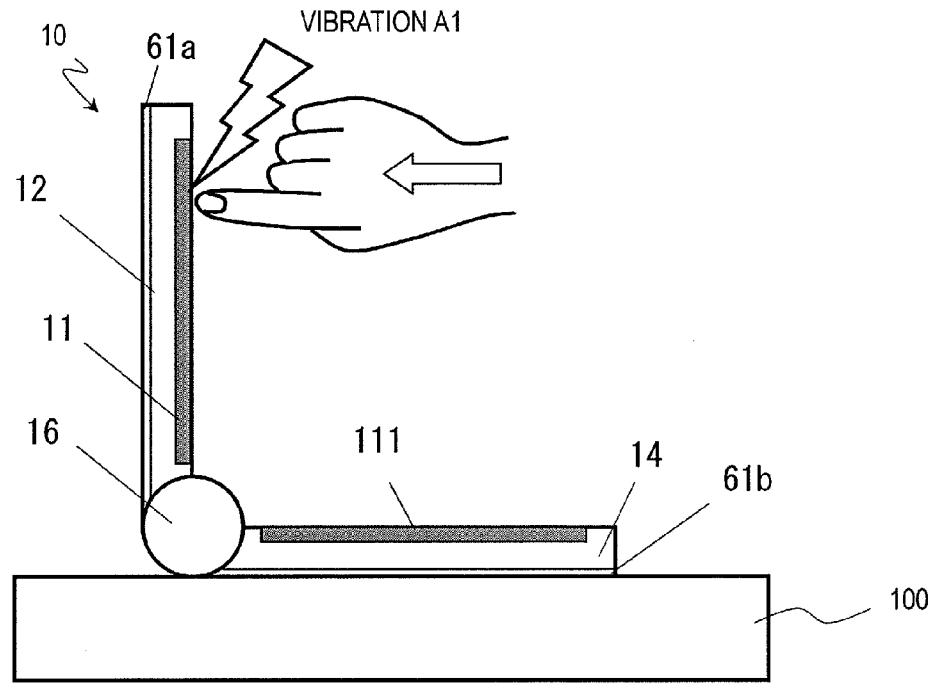
FIG. 8A is a cross-sectional view showing an electronic device according to one embodiment.
Figure 8B:
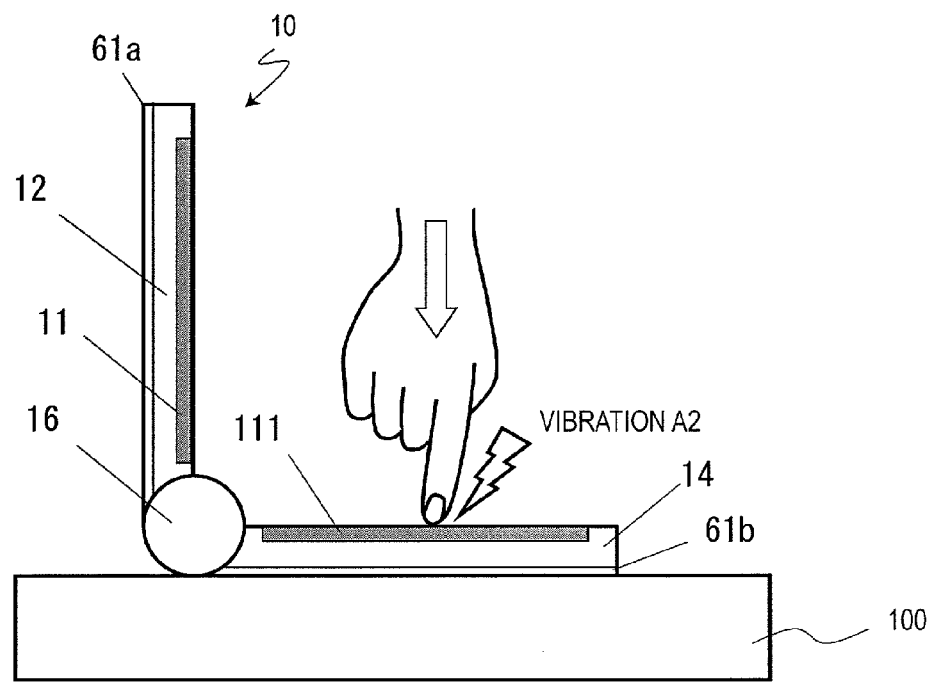
FIG. 8B is a cross-sectional view showing an electronic device according to one embodiment.

FIGS. 8A and 8B are cross-sectional views showing the electronic device 10 including pressure sensors 61a and 61b. The pressure sensor 61a detects the pressure acting upon one side that is opposite to the side on which a touch by the user is detected. In this example, one side that is opposite to the side on which a touch is detected (the right side of the touch panel 11 in the figure) refers to the back side of the display section 12 (the left side in the figure). The pressure sensor 61b detects the pressure acting upon one side that is opposite to the side on which a touch by the user is detected. In this example, one side that is opposite to the side on which a touch is detected (the upper side of the touch panel 111 in the figure) refers to the back side of the casing 14 (the lower side in the figure).

The pressure sensors 61a and 61b detect the pressure acting upon the back side of the display section 12 and the casing 14, respectively. If the pressure detected by the pressure sensor 61a to be acting upon the back side of the display section 12 is low (e.g., less than a predetermined threshold value), it is determined that the touch panel 11 is not stably supported, and vibration A1 is generated on the touch panel 11. If the pressure detected by the pressure sensor 61b to be acting upon the back side of the casing 14 is high (e.g., greater than or equal to a predetermined threshold value), it is determined that the touch panel 111 and the casing 14 are stably supported by the desk 100, and vibration A2 is generated on the touch panel 111.

By generating a greater vibration on the touch panel 11, which easily tilts when touched in a touch operation, the user can reliably perceive the completion of a touch operation even when the user touches with a weak force. Since the user can comfortably perform the touch operation even with a weak force, the user will no longer push the touch panel 11 with an excessive force, and it is therefore possible to prevent the tilt of the device body and to realize stable operations. The touch panel 111 is stably supported by a hand, a desk, or the like. In this position, it is possible to present a comfortable tactile sensation to the user by generating a weaker vibration on the touch panel 111, since the user might feel uncomfortable with the vibration of the touch panel 111 being felt excessively.

Note that when the position of the electronic device 10 is changed so that the pressure detected by the pressure sensor 61a to be acting upon the back side of the display section 12 is high, vibration A2 is generated on the touch panel 11. If the pressure detected by the pressure sensor 61b to be acting upon the back side of the casing 14 is low, vibration A1 is generated on the touch panel 111.

When the support of the touch panel is unstable, the touch panel may sway when touched in a touch operation. An acceleration sensor for detecting such a sway may be provided in the electronic device 10, in which case if the detected sway is greater than or equal to a predetermined threshold, it is determined that the support is unstable so that vibration A1 is generated on the touch panel, whereas if the detected sway is less than a predetermined threshold, vibration A2 is generated on the touch panel.

(Embodiment 3)

Next, the electronic device 10 according to Embodiment 3 will be described. Like components of the electronic device 10 of Embodiment 3 to those of the electronic device 10 of Embodiment 1 will be denoted by like reference numerals and will not be described redundantly.

Figure 9:
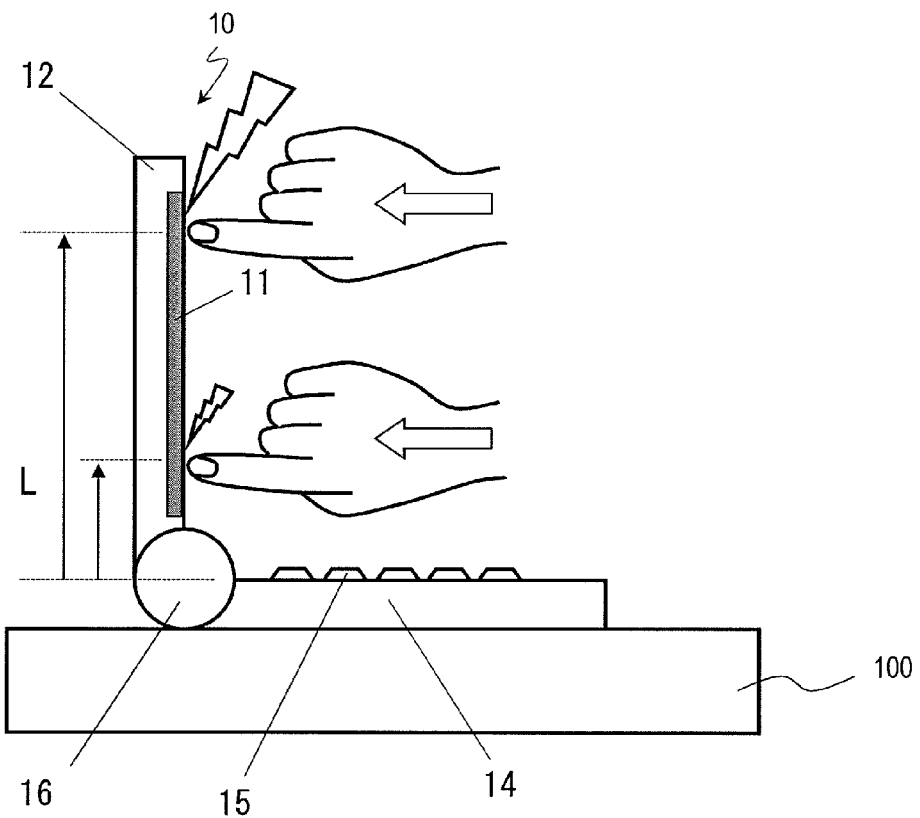
FIG. 9 is a cross-sectional view showing an electronic device according to one embodiment.

FIG. 9 is a cross-sectional view showing the electronic device 10 of Embodiment 3. For touch operations performed by the user with an equal force, the electronic device 10 more easily tilts and the operation becomes more unstable as distance L is longer, where L denotes the distance from the connecting portion 16 to the touch position of the user. By generating a greater vibration when distance L is longer than when distance L is shorter, the user can reliably perceive the completion of a touch operation even when the user touches a position at a long distance L with a weak force. Since the user can comfortably perform the touch operation even with a weak force, the user will no longer push the touch panel 11 with an excessive force, and it is therefore possible to prevent the tilt of the device body and to realize stable operations.

Information on the touch position of the user having touched the touch panel 11 is sent to the microcomputer 20 via the touch panel control section 31. The microcomputer 20 calculates distance L between the touch position and the connecting portion 16, and sends the vibration control section 33 an instruction for generating amplitude A in accordance with distance L, thereby vibrating the vibrating section 13.

Figure 10:
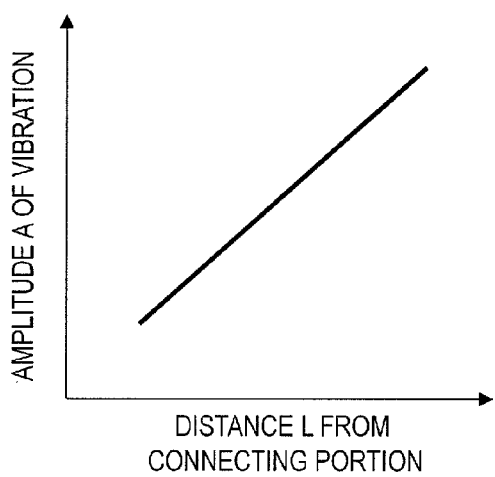
FIG. 10 is a graph showing the relationship between the distance and the amplitude according to one embodiment.

FIG. 10 is a graph showing an example of the relationship between distance L and amplitude A. As shown in FIG. 10, the vibrating section 13 is vibrated so that amplitude A is larger as distance L is longer.

By controlling the vibration in accordance with the distance from the connecting portion 16 to the touch position, it is possible to realize a touch input that is reliable and stable.

(Other Embodiments)

As described above, Embodiments 1-3 have been described above as examples of the technique disclosed in the present application. However, the technique of this disclosure is not limited thereto, but is also applicable to other embodiments in which changes, replacements, additions, omissions, etc., are made as necessary. Different ones of the elements described in Embodiments 1-3 above may be combined together to obtain a new embodiment.

Other embodiments will be illustrated hereinbelow.

While a control section is provided for each component for controlling the component in the embodiments above, the present disclosure is not limited thereto. Any of various control sections, such as the vibration control section 33, may be implemented by the microcomputer 20.

While Embodiment 1 above is directed to an information terminal device of a notebook personal computer type as an example of the electronic device 10, the electronic device 10 is not limited thereto. For example, the electronic device may be any electronic device including the touch panel 11, such as a tablet-type terminal device, a mobile telephone, a PDA, a game device, a car navigation, an ATM, etc.

While the touch panel 11 covers the entire display surface of the display section 12 in embodiments above, the present disclosure is not limited thereto. For example, the touch panel function may be provided only in a central portion of the display surface while the peripheral portion is not covered by a member having the touch panel function.

While the touch panel 11 provided on the display surface side of the display section 12 has been described as an example of the panel to be touched by the user, the panel is not limited thereto. For example, it may be a pointing device such as a touch pad. In such a case, the vibrating section 13 is provided in the touch pad, and a greater vibration is generated when the support of the touch pad is unstable than when it is stable.

While a tactile sensation is presented by generating vibrations in the embodiments above, the technique of the present disclosure is not limited thereto. Other than vibration, tactile sensations may be presented in other forms, e.g., as a variation of friction using static electricity, a skin stimulation using electric current, and a variation of screen shape using liquid. In addition to presenting a tactile sensation, screen display, sound, light, heat, etc., may be used in combination as necessary.

Note that the operation of the electronic device described above may be implemented by means of hardware or software. A program implementing such a control operation is stored, for example, in an internal memory of the microcomputer 20. Such a computer program may be installed onto the electronic device from a storage medium (an optical disc, a semiconductor memory, etc.) storing the computer program, or may be downloaded via a telecommunications network such as the Internet.

(Summary)

The electronic device 10 according to one embodiment includes the casing 14, the display section 12 for displaying information, the touch panel 11 to be touched by the user, the connecting portion 16 connecting together the casing 14 and the touch panel 11, the vibrating section 13 for vibrating the touch panel 11, and the vibration control section 33 for controlling the vibration of the vibrating section 13. The vibration control section 33 controls the vibration so as to generate a greater vibration when the touch panel 11 is supported only by the connecting portion 16 than when the touch panel 11 is supported by the connecting portion 16 and another point of support other than the connecting portion 16. With the electronic device 10, it is possible to reliably give a tactile sensation when the user makes a touch input, thereby ensuring a reliable input and also realizing a stable touch input.

The electronic device 10 according to one embodiment includes the casing 14, the display section 12 for displaying information, the touch panel 11 to be touched by the user, the vibrating section 13 for vibrating the touch panel 11, the vibration control section 33 for controlling the vibration of the vibrating section 13, and a tilt angle sensor 51 for detecting the tilt angle of the touch panel 11. The vibration control section 33 controls the vibration so as to generate a greater vibration when the touch panel 11 is not horizontal than when the touch panel 11 is horizontal. With the electronic device 10, it is possible to reliably give a tactile sensation when the user makes a touch input, thereby ensuring a reliable input and also realizing a stable touch input.

The electronic device 10 according to one embodiment includes the casing 14, the display section 12 for displaying information, the touch panel 11 to be touched by the user, the vibrating section 13 for vibrating the touch panel 11, and the vibration control section 33 for controlling the vibration of the vibrating section 13. The vibration control section 33 controls the vibration based on the distance between the position at which the user touches the touch panel 11 and the connecting portion 16. For example, a greater vibration is generated when the distance between the touch position on the touch panel 11 and the connecting portion 16 is longer than when it is shorter.

With the electronic device 10, it is possible to reliably give a tactile sensation when the user makes a touch input, thereby ensuring a reliable input and also realizing a stable touch input.

The electronic device 10 according to one embodiment includes the casing 14, the display section 12 for displaying information, the touch panel 11 to be touched by the user, the vibrating section 13 for vibrating the touch panel 11, the vibration control section 33 for controlling the vibration of the vibrating section 13, and the pressure sensors 61 for detecting the pressure acting upon one side that is opposite to the side on which a touch by the user is detected. A greater vibration is generated when the detected pressure is lower than when it is higher. With the electronic device 10, it is possible to reliably give a tactile sensation when the user makes a touch input, thereby ensuring a reliable input and also realizing a stable touch input.

A computer program according to one embodiment instructs the electronic device 10 to perform vibration operations, wherein the electronic device 10 includes the touch panel 11 to be touched by the user and the casing 14 connected together with the connecting portion 16 therebetween. The computer program instructs the computer 20 of the electronic device 10 to perform the steps of:

detecting whether the touch panel 11 is supported by the connecting portion 16 and another point of support other than the connecting portion 16 or the touch panel 11 is supported only by the connecting portion 16; and generating a greater vibration when the touch panel 11 is supported only by the connecting portion 16 than when the touch panel 11 is supported by the connecting portion 16 and another point of support other than the connecting portion 16. With the computer program according to one embodiment, it is possible to reliably give a tactile sensation when the user makes a touch input, thereby ensuring a reliable input and also realizing a stable touch input.

A computer program according to one embodiment instructs the electronic device 10 to perform vibration operations. The computer program instructs the computer 20 of the electronic device 10 to perform the steps of: detecting the tilt angle of the touch panel 11 to be touched by the user; and generating a greater vibration when the touch panel 11 is not horizontal than when the touch panel 11 is horizontal. With the computer program according to one embodiment, it is possible to reliably give a tactile sensation when the user makes a touch input, thereby ensuring a reliable input and also realizing a stable touch input.

A computer program according to one embodiment instructs the computer 20 of the electronic device 10 to perform the steps of: detecting the pressure acting upon one side that is opposite to the side of the touch panel 11 on which a touch by the user is detected; and generating a greater vibration when the detected pressure is lower than when the detected pressure is higher. With the computer program according to one embodiment, it is possible to reliably give a tactile sensation when the user makes a touch input, thereby ensuring a reliable input and also realizing a stable touch input.

Embodiments have been described above as an illustration of the technique of the present disclosure. The accompanying drawings and the detailed description are provided for this purpose. Thus, elements appearing in the accompanying drawings and the detailed description include not only those that are essential to solving the technical problems set forth herein, but also those that are not essential to solving the technical problems but are merely used to illustrate the technique disclosed herein.

Therefore, those non-essential elements should not immediately be taken as being essential for the reason that they appear in the accompanying drawings and/or in the detailed description.

The embodiments above are for illustrating the technique disclosed herein, and various changes, replacements, additions, omissions, etc., can be made without departing from the scope defined by the claims and equivalents thereto.

The present disclosure is applicable to an electronic device on which a user can perform a touch operation, for example.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2012-009890 filed on Jan. 20, 2012 and No. 2012-268921 filed on Dec. 10, 2012, the entire contents of which are hereby incorporated by reference.

What is claimed is:

1. An electronic device comprising:
   a casing;
   a display section for displaying information;
   a panel to be touched by a user;
   a connecting portion for connecting together the casing and the panel;
   a vibrating section for vibrating the panel; and
   a vibration control section for controlling the vibration of the vibrating section, wherein the vibration control section generates a greater vibration when the panel is supported only by the connecting portion than when the panel is supported by the connecting portion and another point of support other than the connecting portion.

2. The electronic device of claim 1, wherein the vibration control section controls the vibration based on a distance between a touch position of the user on the panel and the connecting portion.

3. The electronic device of claim 2, wherein the vibration control section generates a greater vibration when the distance between the touch position on the panel and the connecting portion is longer than when the distance is shorter.

4. An electronic device comprising:
a casing;
a display section for displaying information;
a panel to be touched by a user;
a vibrating section for vibrating the panel;
a vibration control section for controlling the vibration of the vibrating section; and
an angle detection section for detecting a tilt angle of the panel,
wherein the vibration control section generates a greater vibration when the panel is not horizontal than when the panel is horizontal.

5. The electronic device of claim 4, further comprising a connecting portion for connecting together the casing and the panel,
wherein the vibration control section controls the vibration based on a distance between a touch position of the user on the panel and the connecting portion.

6. The electronic device of claim 5, wherein the vibration control section generates a greater vibration when the distance between the touch position on the panel and the connecting portion is longer than when the distance is shorter.

7. An electronic device comprising:
a casing;
a display section for displaying information;
a panel to be touched by a user;
a vibrating section for vibrating the panel;
a vibration control section for controlling the vibration of the vibrating section; and
a pressure detection section for detecting a pressure acting upon one side that is opposite to a side on which a touch by the user is detected,
wherein the vibration control section generates a greater amplitude vibration when the detected pressure is lower than when the detected pressure is higher.

* * * * *